US011709996B2

(12) United States Patent
Kannan et al.

(10) Patent No.: US 11,709,996 B2
(45) Date of Patent: Jul. 25, 2023

(54) SUGGESTING CAPTIONS FOR CONTENT

(71) Applicant: META PLATFORMS, INC., Menlo Park, CA (US)

(72) Inventors: Anitha Kannan, Saratoga, CA (US); Yuandong Tian, Menlo Park, CA (US); Yann Nicolas Dauphin, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1487 days.

(21) Appl. No.: 15/395,687

(22) Filed: Dec. 30, 2016

(65) Prior Publication Data
US 2018/0189260 A1      Jul. 5, 2018

(51) Int. Cl.
*G06N 3/08*         (2023.01)
*G06N 3/044*        (2023.01)
*G06F 40/274*       (2020.01)
*H04L 51/52*        (2022.01)

(52) U.S. Cl.
CPC ........... *G06F 40/274* (2020.01); *G06N 3/044* (2023.01); *G06N 3/08* (2013.01); *H04L 51/52* (2022.05)

(58) Field of Classification Search
CPC . G06N 5/04; G06N 5/02; G06N 20/00; G09B 7/04; G06F 9/4446
USPC .......................................................... 706/11
See application file for complete search history.

(56) References Cited

U.S. PATENT DOCUMENTS

| 8,645,991 B2* | 2/2014 | McIntire | G06F 16/48 |
| | | | 725/34 |
| 10,222,939 B1* | 3/2019 | Lewis | H04N 21/44008 |
| 2013/0339180 A1* | 12/2013 | LaPierre | G06Q 30/0631 |
| | | | 705/26.7 |
| 2014/0096039 A1* | 4/2014 | Schultz | G06F 3/048 |
| | | | 715/753 |
| 2014/0193047 A1* | 7/2014 | Grosz | G06Q 10/10 |
| | | | 382/118 |
| 2015/0019203 A1* | 1/2015 | Smith | G06F 3/048 |
| | | | 704/9 |
| 2016/0132591 A1* | 5/2016 | Clark | G06F 16/335 |
| | | | 707/723 |
| 2017/0132821 A1* | 5/2017 | Valliani | G06K 9/6267 |
| 2017/0177623 A1* | 6/2017 | Chen | G06F 16/285 |
| 2017/0200065 A1* | 7/2017 | Wang | G06K 9/4628 |
| 2017/0200066 A1* | 7/2017 | Wang | G06N 3/08 |

* cited by examiner

*Primary Examiner* — Viker A Lamardo
(74) *Attorney, Agent, or Firm* — Sheppard Mullin Richter & Hampton LLP

(57) ABSTRACT

Systems, methods, and non-transitory computer-readable media can train a sequence model to output respective captions, or portions of captions, for content items. A determination can be made that a user of the social networking system is posting a content item for publication through a social networking system. A set of captions, or portions of captions, can be determined for the content item being posted based at least in part on the sequence model. The set of captions, or portions of captions, can be provided as suggestions to the user for use in a caption describing the content item being posted.

20 Claims, 7 Drawing Sheets

SUGGESTING CAPTIONS FOR CONTENT

FIELD OF THE INVENTION

The present technology relates to the field of content suggestion. More particularly, the present technology relates to techniques for suggesting content to users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to train a sequence model to output respective captions, or portions of captions, for content items. A determination can be made that a user of the social networking system is posting a content item for publication through a social networking system. A set of captions, or portions of captions, can be determined for the content item being posted based at least in part on the sequence model. The set of captions, or portions of captions, can be provided as suggestions to the user for use in a caption describing the content item being posted.

In an embodiment, the systems, methods, and non-transitory computer readable media are configured to determine a set of features that describe subject matter captured in the content item and generate the set of captions, or portions of captions, using the sequence model based at least in part on the set of features.

In an embodiment, the systems, methods, and non-transitory computer readable media are configured to determine a set of features that describe subject matter captured in the content item, determine user input that was entered for the caption describing the content item, and generate the set of captions, or portions of captions, using the sequence model based at least in part on the set of features and the user input.

In an embodiment, the systems, methods, and non-transitory computer readable media are configured to filter the set of captions, or portions of captions, based at least in part on a user-specific language model to restrict the set to captions, or portions of captions, that include terms or phrases preferred by the user.

In an embodiment, the systems, methods, and non-transitory computer readable media are configured to determine that the user has selected one of the suggested captions, or portions of captions, in the set and cause the content item to be published through the social networking system with the caption describing the content item being posted, wherein at least a portion of the caption describing the content item being posted includes the selected caption or portion of caption.

In an embodiment, the systems, methods, and non-transitory computer readable media are configured to generate a set of training examples that each include at least a corresponding set of features that describe a content item published through the social networking system and a respective caption that was provided for the content item.

In an embodiment, each training example also includes metadata information for the content item referenced in the training example.

In an embodiment, the systems, methods, and non-transitory computer readable media are configured to determine at least one set of content items, wherein a content item included in the at least one set captures subject matter that has a threshold similarity to other content items in the set, determine one or more captions that are associated with all content items included in the at least one set, and associate each of the one or more captions with each content item included in the at least one set, wherein each training example references data describing a content item in the at least one set and a caption associated with the content item.

In an embodiment, the systems, methods, and non-transitory computer readable media are configured to determine a respective set of features that describe subject matter captured for each of a plurality of content items published through the social networking system and cluster the plurality of content items into one or more clusters, wherein the content items are clustered based at least in part on their respective sets of features.

In an embodiment, a caption, or portion of caption, provided as a suggestion includes at least a predicted character, word, term, phrase, or sentence.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
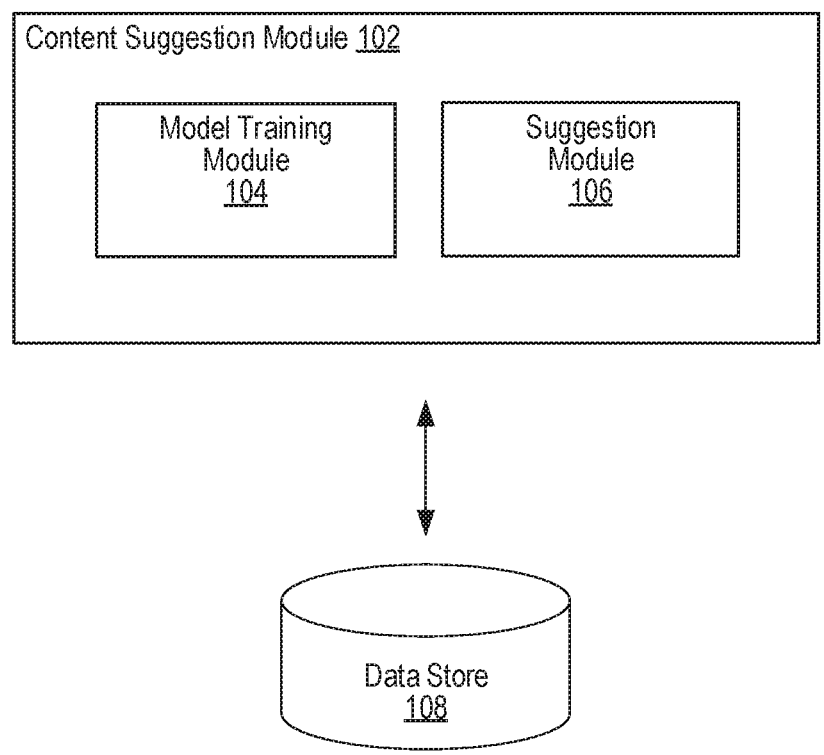
FIG. 1 illustrates an example system including an example content suggestion module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches For Suggesting Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users can post content items (e.g., images, videos, etc.) to a social networking system. In some instances, users can include captions to describe or provide some context for the content items. Existing approaches allow users to specify captions, for example, through an interface using an input device and/or a virtual keyboard that is presented on the display of their device. There may be instances in which a user is unsure of what caption to include for a given content item. In such instances, some users may opt to include a non-descriptive caption or not to include a caption at all. In general, captions that describe content items can be useful for many purposes. As a result, users should be discouraged from providing non-descriptive captions or omitting captions altogether. In one example, captions provide a better experience for other users of the social networking system that view the user's posted content items. In another example, captions may be useful for indexing posts and/or content items so that they can easily be retrieved in response to search queries. While existing approaches provide users with the option to specify captions, such approaches typically do not encourage the user to specify captions nor do such approaches improve the ease in which such captions can be specified. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a sequence model (e.g., a recurrent neural network, a long-short term memory network, etc.) can be trained to analyze captions that were provided with various content items so that suggestions for captions, or portions of captions, can be provided when users subsequently post new content items. In various embodiments, the model can be trained to suggest captions, or portions of a captions, for a content item, based, in part, on any portions of the caption that have been already been inputted by the user for the content item (e.g., one or more characters and/or one or more words) and also with respect to the visual features (e.g., image features) corresponding to the content item. In some embodiments, the model provides the suggestions based on the visual features of the content item. For example, the model can provide suggestions for a set of characters or words to be included in the caption based on the visual features of the content item. In some embodiments, the model provides the suggestions as the user is typing the caption for the content item. For example, the model can provide suggestions for the next character or word in view of a set of characters or words that have been provided by the user. By providing suggestions for captions, or portions of captions, users can be encouraged to include captions with their content items and, in some instances, provide more descriptive captions. In various embodiments, the sequence models utilized herein (e.g., the recurrent neural network, long-short term memory network, etc.) may have multiple layers.

FIG. 1 illustrates an example system 100 including an example content suggestion module 102, according to an embodiment of the present disclosure. As shown in the example of FIG. 1, the content suggestion module 102 can include a model training module 104 and a suggestion module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content suggestion module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content suggestion module 102 can be implemented, in part or in whole, as software running on one or more computing devices or systems, such as on a user or client computing device. In one example, the content suggestion module 102 or at least a portion thereof can be implemented as or within an application (e.g., app), a program, or an applet, etc., running on a user computing device or a client computing system, such as the user device 610 of FIG. 6. In another example, the content suggestion module 102 or at least a portion thereof can be implemented using one or more computing devices or systems that include one or more servers, such as network servers or cloud servers. In some instances, the content suggestion module 102 can, in part or in whole, be implemented within or configured to operate in conjunction with a social networking system (or service), such as the social networking system 630 of FIG. 6.

The content suggestion module 102 can be configured to communicate and/or operate with the at least one data store 108, as shown in the example system 100. The at least one data store 108 can be configured to store and maintain various types of data. For example, the data store 108 can store information describing captions provided by users for various content items (e.g., content items published through the social networking system) as well as data describing the respective content items (e.g., feature descriptors, etc.). In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

Figure 6:
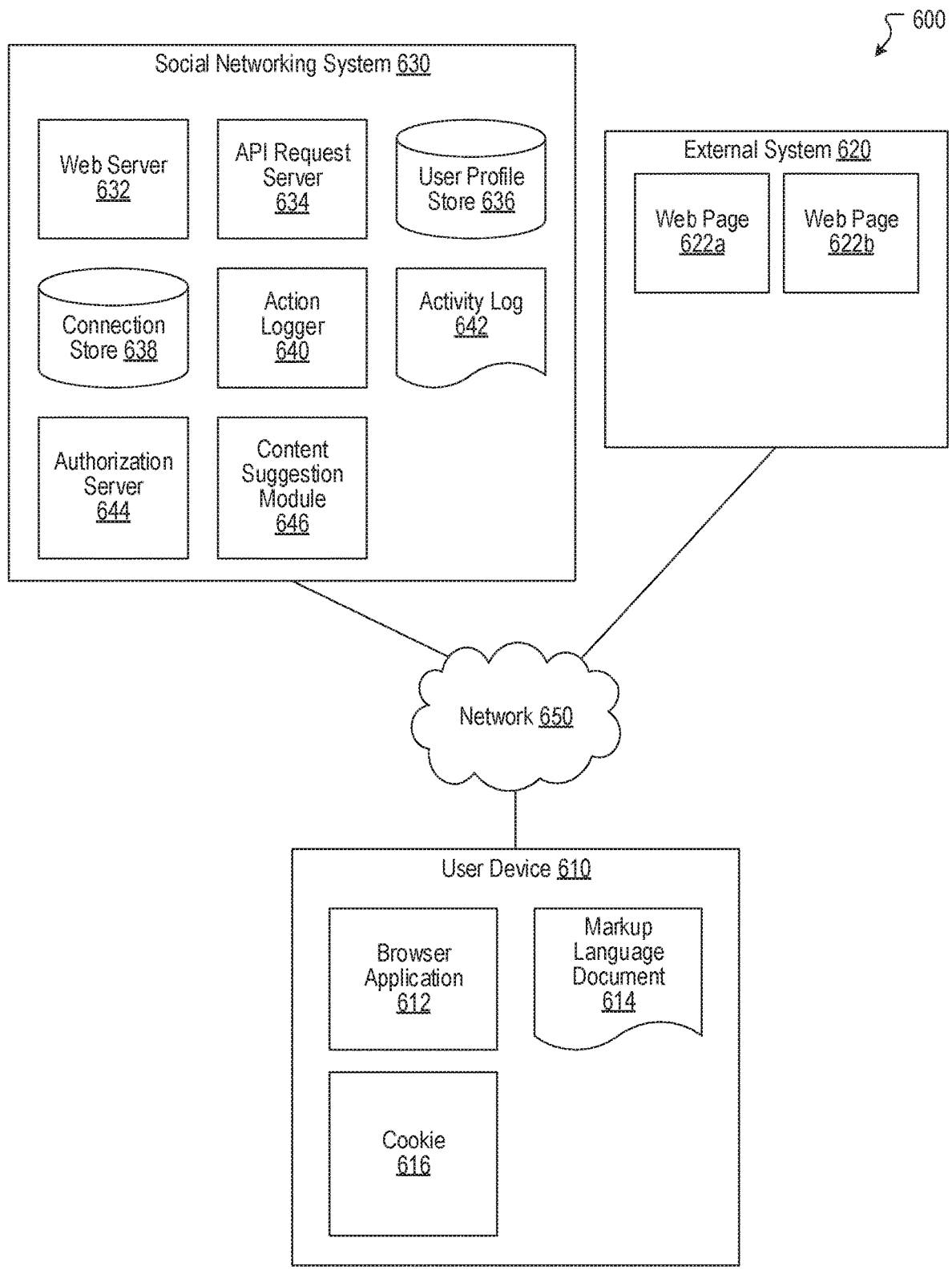
FIG. 6 illustrates a network diagram of an example system including an example social networking system that can be utilized in various scenarios, according to an embodiment of the present disclosure.

As mentioned, the content suggestion module 102 can, in part or in whole, be implemented within or configured to operate in conjunction with a social networking system (or service), such as the social networking system 630 of FIG. 6. In various embodiments, the content suggestion module 102 can be configured to train and utilize a sequence model for suggesting captions, or portions of captions, to users of the social networking system. In one example, such captions, or portions of the captions, may be provided as suggestions when users are initially uploading, or posting, content items for publication through the social networking system. In another example, such captions, or portions of the captions, may be determined for content items that were already posted without a caption. In some embodiments, the model training module 104 can train the model using information that is extracted from data describing previously posted content items and their corresponding captions. More details regarding the model training module 104 will be provided below with reference to FIG. 2. Once the model is trained, the suggestion module 106 can be used to provide suggestions to users. More details regarding the suggestion module 106 will be provided below with reference to FIG. 3.

Figure 2:
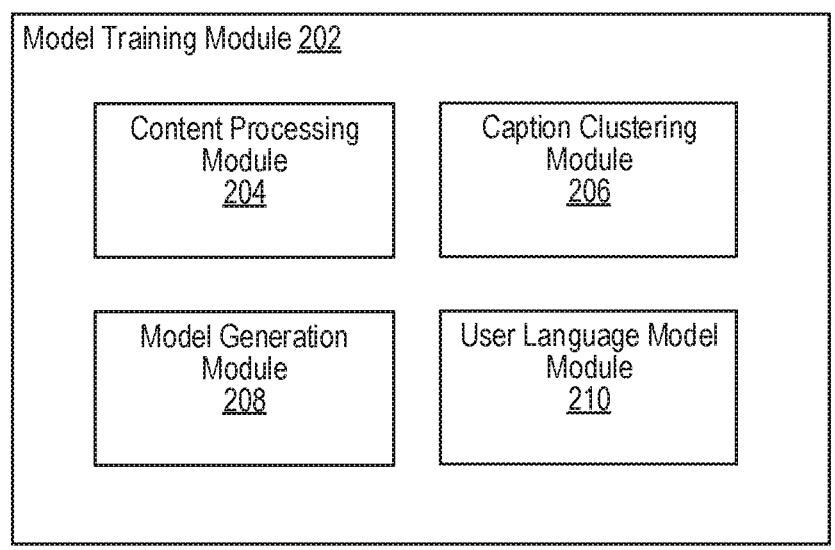
FIG. 2 illustrates an example model training module, according to an embodiment of the present disclosure.

FIG. 2 illustrates an example of a model training module 202, according to an embodiment of the present disclosure. In some embodiments, the model training module 104 of FIG. 1 can be implemented as the model training module 202. As shown in FIG. 2, the model training module 202 can include a content processing module 204, a caption clustering module 206, a model generation module 208, and a user language model module 210.

In various embodiments, the model training module 202 can be configured to train a sequence model using information describing content items that are published through the social networking system. In one example, the sequence model may be configured as a long-short term memory (LSTM) network. Other approaches and/or variations for configuring the sequence model (e.g., recurrent neural network) may be applied depending on the implementation. In some embodiments, the training examples used to generate the model each include data describing the subject matter captured in a content item along with a corresponding caption that was used to describe the content item. In some embodiments, each training example can also reference an identifier (e.g., content id, image id, etc.) for the content item. As described below, the model can be trained to relate data describing the subject matter captured by a content item to the corresponding caption provided for the content item. Once trained, the model can be used to predict captions, or portions of captions, for new content items (e.g., images, videos, etc.).

The content processing module 204 can be configured to determine data describing the respective subject matter that is captured in various content items. In various embodiments, the content processing module 204 is configured to generate a corresponding set of features (e.g., feature descriptors, image features, feature vectors, etc.) for content items that describe the respective subject matter of the content items. When generating a set of features for a content item, the content processing module 204 can perform a classification analysis to determine the subject matter that is reflected in the content item. In some embodiments, the content processing module 204 can perform the classification analysis by applying a machine learning model (content classifier) to the content item. In particular, the content processing module 204 can determine a probability regarding whether the content item reflects predetermined subject matter (e.g., identities, or names, of individuals, objects, activities, products, logos, animals, points of interest, or other concepts). The content classifier can be based on any machine learning technique, including but not limited to a deep convolutional neural network. The content classifier supported by the content processing module 204 can be trained and tested to determine the subject matter reflected in a content item. In a development phase, contextual cues for a sample set of content items can be gathered. Categories, or classes, corresponding to various subject matter can be determined. Correlation of the sample set of content items with the categories, or classes, based on the contextual cues can be determined. A training set of content items can be generated from the sample set of content items based on scores indicative of high correlation. The training set of content items can be used to train the content classifier to generate visual pattern templates of the categories or classes. In an evaluation phase, the content classifier can be applied to a new content item (e.g., image) to determine the subject matter reflected in the new image. Once trained, the content processing module 204 can receive a content item as input and can output a set of features that describe the subject matter reflected in the content item.

There may be instances when users post content items that each capture the same, or similar, subject matter albeit with different captions. For example, users may post content items that each capture some aspect of the Eiffel tower with different captions (e.g., "Beautiful day in Paris", "Eiffel tower", "Honeymoon", "Lunch at Eiffel", etc.). In some embodiments, to predict captions more optimally, the sequence model can be trained to relate the same, or similar, subject matter that is captured by various content items to the different captions that are provided for those content items. In such embodiments, the caption clustering module 206 can cluster content items based on similarities between their respective subject matter. For example, the caption clustering module 206 can apply generally known clustering techniques to cluster content items based on the respective sets of features. These sets of features can be determined by the content processing module 204 as described above. The caption clustering module 206 can determine, for each cluster of content items, a set of captions that were provided for the various content items included in the cluster. For example, a first cluster of content items may include a first content item which has a caption C1 (e.g., "Beautiful day in Paris"), a second content item which has a caption C2 (e.g., "Eiffel tower"), and a third content item which has a caption C3 (e.g., "Lunch at Eiffel"). In this example, the set of captions for this first cluster includes the captions C1, C2, and C3. The caption clustering module 206 can associate each caption in this set with each content item that is included in the first cluster. Thus, first content item can be associated with the captions C1, C2, and C3. Similarly, second content item and third content item can also each be associated with the captions C1, C2, and C3. In some embodiments, captions that reference specific individuals or users (e.g., "At the Eiffel tower with John Doe") can be parsed to remove such references (e.g., "At the Eiffel tower with [user]" or just "At the Eiffel tower") so that the referenced entities are not included in the training examples.

Such associations can be represented in the training examples that are used to train the sequence model. In some embodiments, the model generation module 208 can generate separate training examples for each caption associated with a content item. For example, as described above, the first content item was associated with the captions C1, C2, and C3. In this example, a first training example includes data describing the first content item and the caption C1 (e.g., "Beautiful day in Paris"), a second training example includes data describing the first content item and the caption C2 (e.g., "Eiffel tower"), and a third training example includes data describing the third content item and the caption C3 (e.g., "Lunch at Eiffel"). Such multiple training examples can similarly be generated for both the second content item and third content item.

In some embodiments, training examples for a given content item can also include information describing metadata (e.g., image metadata) that is associated with content item. Such information can include, for example, technical information about the content item and its capture method, such as exposure settings, capture time, GPS location information, camera type and/or model used to capture the content item, and descriptive information such as keywords that describe the content item. In one example, the training examples used to generate the sequence model can each include data describing the subject matter captured in a content item, a corresponding caption that was used to describe the content item, and information describing metadata associated with the content item.

The model generation module 208 can use these training examples to generate the sequence model for suggesting captions, or portions of captions, to users. In general, for any user, this model can be used to provide suggested captions, or portions of captions, for content items that are posted by the user. The model can be trained to predict captions, or portions of captions, based on various types of inputs. For example, in some embodiments, when the user provides a first input (e.g., one or more characters or one or more words) for a caption describing a content item, the model predicts content (e.g., the next character, word, term, phrase, etc.) for the caption based on the first input. In such embodiments, when the user provides a second input (e.g., one or more characters or one or more words), the model can predict additional content (e.g., the next character, word, term, phrase, etc.) for the caption based on the second input. In some embodiments, the model can predict the content for the caption in view of all of the preceding user input (e.g., both the first input and the second input).

In some instances, the model's predictions may be conditioned on a set of features that were determined for a content item being posted. As mentioned, this set of features can describe the subject matter that is captured by the content item. For example, in some embodiments, when the user provides a first input (e.g., one or more characters or one or more words) for a caption describing a content item, the model predicts content (e.g., the next character, word, term, phrase, etc.) for the caption based on both the first input and the set of features describing the subject matter in the content item. In such embodiments, when the user provides a second input (e.g., one or more characters or one or more words), the model can predict additional content (e.g., the next character, word, term, phrase, etc.) for the caption based on both the second input and the set of features. In some embodiments, the model can predict the content for the caption based on all of the preceding user input (e.g., the first input, the second input, etc.) and the set of features describing the subject matter in the content item. In general, for a given content item, the model can continue providing suggested captions, or portions of captions, until the probability of arriving at an end token given the preceding input satisfies a threshold. In various embodiments, the captions, or portions of captions, outputted by the sequence model are each generally composed of various combinations of tokens (e.g., characters, words, terms, phrases, etc.) over the different captions that were used to train the model.

In some embodiments, the captions, or portions of captions, that are suggested may be customized based on a user's vocabulary. For example, in such embodiments, the user language model module 210 can train a user-specific language model using a corpus of words that are often used by a user. The user-specific language model can be used in conjunction with the sequence model to suggest captions, or portions of captions, based on the user's vocabulary. For example, the user-specific language model can be used to influence the structure and/or type of words used in captions generated for the user. In some embodiments, a set of suggestions outputted from the sequence model are provided as input to the user-specific language model so that the set of suggestions can be restricted to suggestions that include content (e.g., terms and/or phrases, etc.) that corresponds to the user's vocabulary. That is, the suggestions can be restricted so that only captions, or portions of captions, that include content typically used by the user (e.g., terms and/or phrases that satisfy some threshold usage measurement) are included. Naturally, such models can be trained to provide suggestions for any type of input including, for example, emoji. For example, in some embodiments, captions provided by a user for images in a photo album can be used as inputs to the sequence model for purposes of generating, or influencing, respective captions for images that are subsequently added to the photo album.

In some embodiments, captions, or portions of the captions, may be generated for posted content items that do not have a corresponding a caption and/or descriptive metadata. For example, the sequence model can be used to generate corresponding captions for such content items. In such embodiments, the generated captions can be used to reference the respective content items, for example, in a search index. In some embodiments, such generated captions can be used to identify various content items that are responsive to search queries (e.g., natural language queries).

Figure 3:
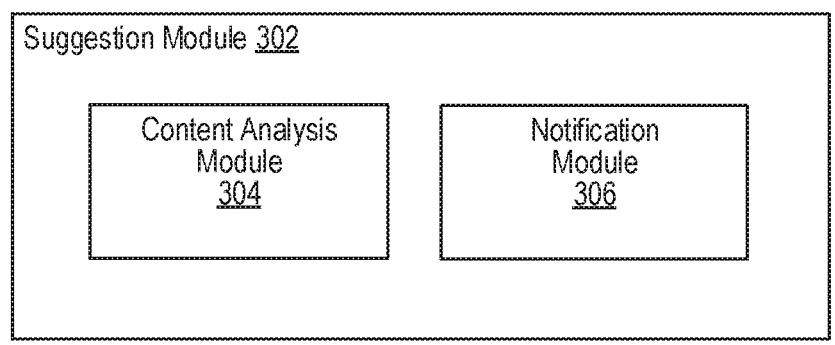
FIG. 3 illustrates an example suggestion module, according to an embodiment of the present disclosure.

FIG. 3 illustrates an example suggestion module 302, according to an embodiment of the present disclosure. In some embodiments, the suggestion module 106 of FIG. 1 can be implemented as the suggestion module 302. As shown in FIG. 3, the suggestion module 302 can include a content analysis module 304 and a notification module 306.

In some embodiments, the content analysis module 304 can be configured to determine suggested captions, or portions of captions, for a content item using the sequence model that was generated by the model training module 202 of FIG. 2. For example, upon determining that a user is posting a content item to the social networking system, the content analysis module 304 can use the sequence model to generate a set of suggested captions, or portions of captions, that can be selected for use in a caption for the content item. In some embodiments, the set of suggested captions, or portions of captions, are determined based, in part, on a set of features describing the subject matter captured in the content item being posted. In some embodiments, the set of suggested captions, or portions of captions, are determined based, in part, on user input (e.g., characters, words, terms, phrases, etc.) being entered for use in the caption for the content item. In some embodiments, the set of suggested captions, or portions of captions, are determined based, in part, on both the set of features describing the subject matter captured in the content item being posted and any user input (e.g., characters, words, terms, phrases, etc.) being entered for use in the caption for the content item. In some embodiments, the set of suggestions can be modified based on a user-specific language model so that the suggestions correspond to content (e.g., terms, phrases, emoji, etc.) that are typically used by the user when posting content.

The notification module 306 can provide the set of suggested captions, or portions of captions, to the user for use in the caption for the content item. In some embodiments, the notification module 306 provides the set of suggestions in an interface that is presented on a display screen of the user's computing device. For example, the set suggestions may be provided in a drop-down menu and/or as auto-complete options. More details describing the provision of suggestions will be provided below with reference to FIG. 4.

Figure 4:
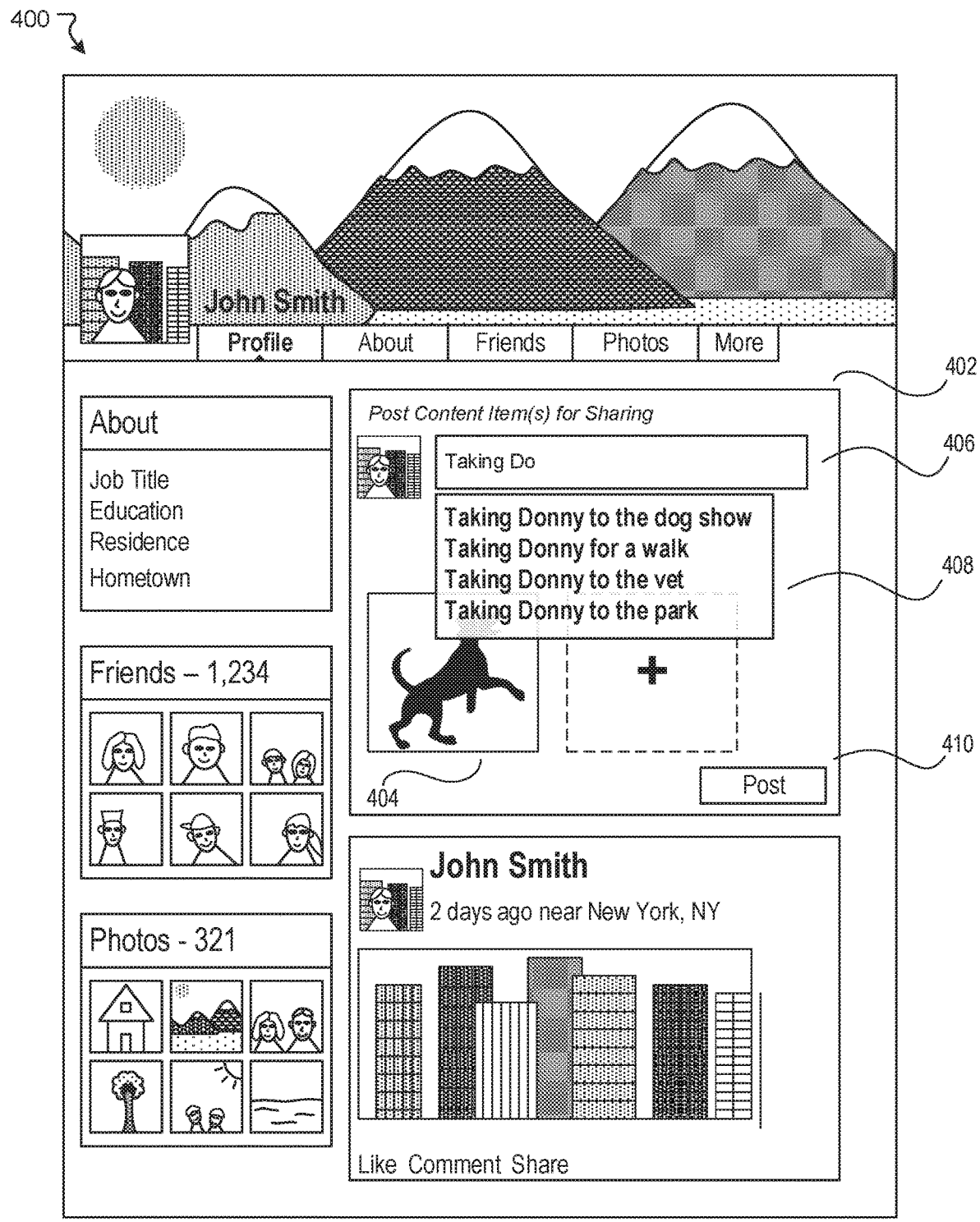
FIG. 4 illustrates an example interface, according to various embodiments of the present disclosure.

FIG. 4 illustrates an example interface 400, according to various embodiments of the present disclosure. The interface 400 is shown providing an example social profile page that belongs to a user John Smith of a social networking system (e.g., the social networking system 630 of FIG. 6).

As mentioned, in various embodiments, users can share content items through the social networking system. As shown in FIG. 4, an interface 402 is provided for sharing content items with users of the social networking system. The user John Smith can identify one or more content items 404 to be posted. Upon specifying the content item 404 to be posted, in various embodiments, a set of suggested captions, or portions of captions, 408 can be provided to the user for use in the caption 406 for the content item 404. As mentioned, in some embodiments, the set of suggested captions, or portions of captions, 408 are determined based, in part, on a set of features describing the subject matter captured in the content item 404 being posted. Thus, in such embodiments, the suggestions 408 may be determined based on the subject matter reflected in the content item 404. In some embodiments, the set of suggested captions, or portions of captions, 408 are determined based, in part, on user input (e.g., "Taking Do") being entered for use in the caption 406 for the content item. Thus, in such embodiments, the suggestions 408 may be determined based on user input being entered to be used in the caption 406. In some embodiments, the set of suggested captions, or portions of captions, are determined based, in part, on both the set of features describing the subject matter captured in the content item being posted and any user input (e.g., characters, words, terms, phrases, etc.) being entered for use in the caption for the content item. The user can select any of the suggestions 408 to auto-complete the caption 406 for the content item. Finally, the user can select the option 410 to post the content item 404 to the social networking system along with its corresponding caption 406.

Figure 5:
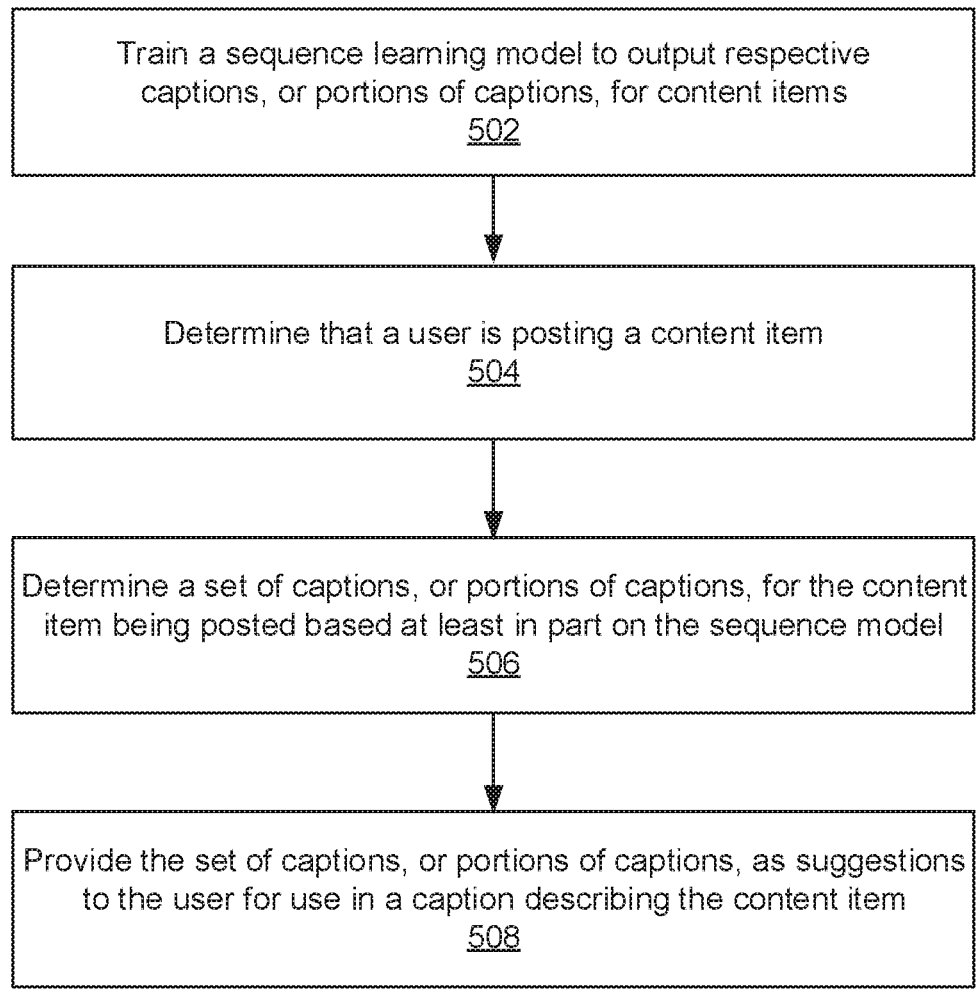
FIG. 5 illustrates an example process for suggesting content, according to various embodiments of the present disclosure.

FIG. 5 illustrates an example process 500 for suggesting content, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a sequence model can be trained to output respective captions, or portions of captions, for content items. At block 504, a determination can be made that a user of the social networking system is posting a content item for publication through a social networking system. At block 506, a set of captions, or portions of captions, can be determined for the content item being posted based at least in part on the sequence model. At block 508, the set of captions, or portions of captions, can be provided as suggestions to the user for use in a caption describing the content item being posted.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content suggestion module 646. The content suggestion module 646 can, for example, be implemented as the content suggestion module 102 of FIG. 1. As discussed previously, it should be appreciated that there can be many variations or other possibilities.

Hardware Implementation

Figure 7:
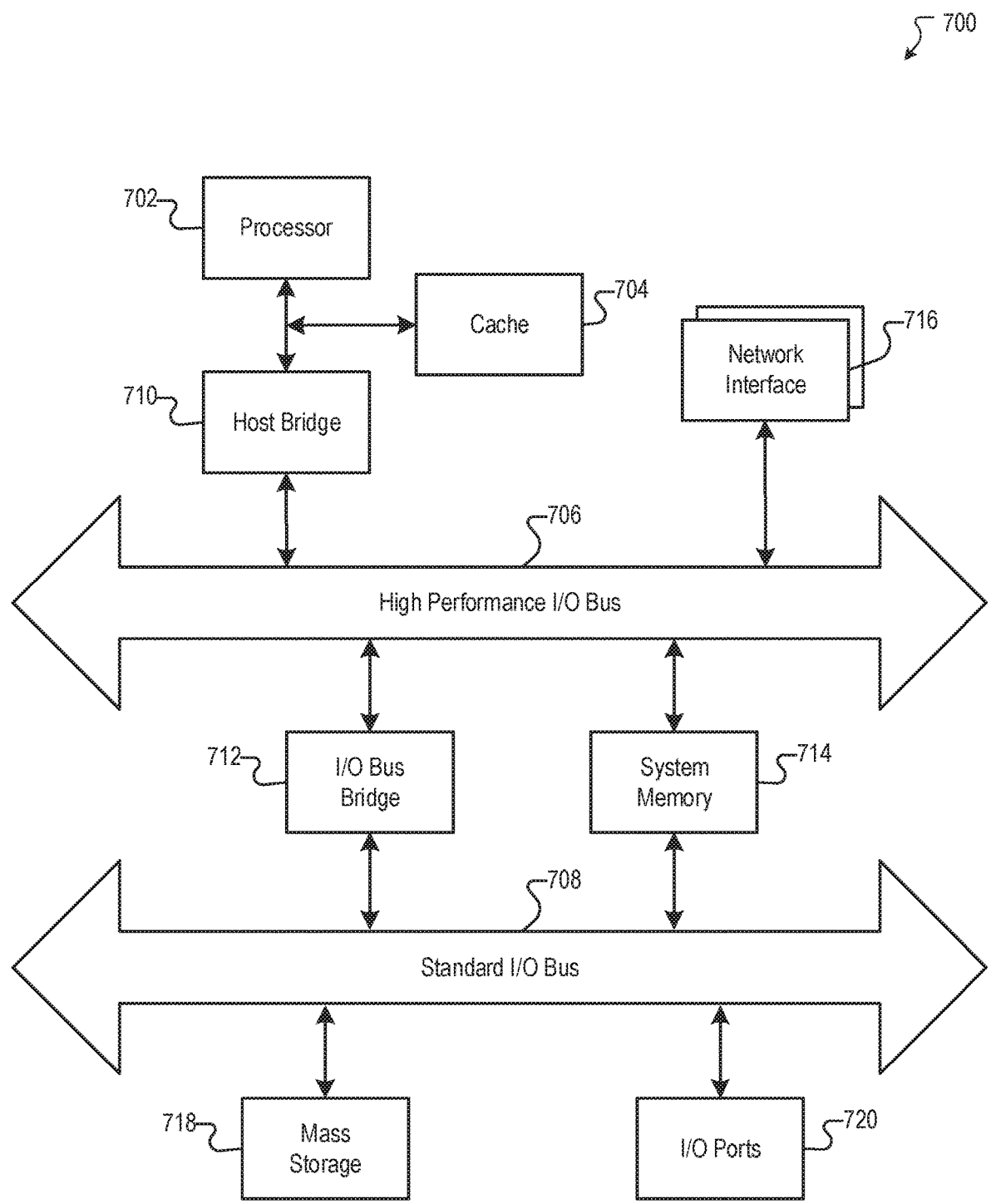
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a content item;
    determining, by the computing system, a partially entered caption for the content item in an interface;
    determining, by the computing system, a set of captions for the content item based at least in part on a long-short term memory neural network and a language model, wherein the determining further comprises:
        generating, by the computing system, at least one caption based on the long-short term memory neural network, wherein the long-short term memory neural network is trained based on training data that relates visual features associated with a plurality of content items and captions associated with the plurality of content items, and wherein the long-short term memory neural network generates the at least one caption based on visual features associated with the content item and the partially entered caption for the content item;
        evaluating, by the computing system, the at least one generated caption based on the language model; and
    providing, by the computing system, the set of captions in an interface, wherein the set of captions are provided as suggested captions based on the content item and the partially entered caption for the content item.

2. The computer-implemented method of claim 1, wherein determining the set of captions further comprises:
    determining, by the computing system, a set of features that describe subject matter captured in the content item; and
    generating, by the computing system, the set of captions based at least in part on provision of the set of features to the long-short term memory neural network.

3. The computer-implemented method of claim 1, wherein determining the set of captions further comprises:
    determining, by the computing system, a set of features that describe subject matter captured in the content item;
    determining, by the computing system, user input that corresponds to the partially entered caption; and
    generating, by the computing system, the set of captions based at least in part on provision of the set of features and the user input to the long-short term memory neural network.

4. The computer-implemented method of claim 3, the method further comprising:
    filtering, by the computing system, the set of captions based at least in part on the language model to restrict the set to captions that include terms or phrases determined to be preferred by the user.

5. The computer-implemented method of claim 1, the method further comprising:
    determining, by the computing system, that the user has selected one of the suggested captions in the set; and
    providing, by the computing system, the content item for publication with the caption describing the content item, wherein at least a portion of the caption describing the content item includes the selected caption.

6. The computer-implemented method of claim 1, further comprising:
    generating, by the computing system, a set of training examples that each include at least a corresponding set of features that describe a given content item and a respective caption that was provided for the content item; and training, by the computing system, the long-short term memory neural network based on the set of training examples.

7. The computer-implemented method of claim 6, wherein a training example also includes metadata information for the content item referenced in the training example.

8. The computer-implemented method of claim 6, wherein generating the set of training examples further comprises:

determining, by the computing system, at least one set of content items, wherein a content item included in the at least one set captures subject matter that has a threshold similarity to other content items in the set;

determining, by the computing system, one or more captions that are associated with all content items included in the at least one set; and associating, by the computing system, each of the one or more captions with each content item included in the at least one set, wherein each training example references data describing a content item in the at least one set and a caption associated with the content item.

9. The computer-implemented method of claim 8, wherein determining the at least one set of content items further comprises:

determining, by the computing system, a respective set of features that describe subject matter captured for each of a plurality of content items published through the computing system; and clustering, by the computing system, the plurality of content items into one or more clusters, wherein the content items are clustered based at least in part on their respective sets of features.

10. The computer-implemented method of claim 1, wherein a caption provided as a suggestion includes at least a predicted character, word, term, phrase, or sentence.

11. A system comprising:
at least one processor; and
a memory storing instructions that, when executed by the at least one processor, cause the system to perform:
determining a content item;
determining a partially entered caption for the content item;
determining a set of captions for the content item based at least in part on a long-short term memory neural network and a language model, wherein the determining further comprises:
generating at least one caption based on the long-short term memory neural network, wherein the long-short term memory neural network is trained based on training data that relates visual features associated with a plurality of content items and captions associated with the plurality of content items, and wherein the long-short term memory neural network generates the at least one caption based on visual features associated with the content item and the partially entered caption for the content item;
evaluating the at least one generated caption based on the language model; and
providing the set of captions in an interface, wherein the set of captions are provided as suggested captions based on the content item and the partially entered caption for the content item.

12. The system of claim 11, wherein determining the set of captions further causes the system to perform:
determining a set of features that describe subject matter captured in the content item; and
generating the set of captions based at least in part on provision of the set of features to the long-short term memory neural network.

13. The system of claim 11, wherein determining the set of captions further causes the system to perform:
determining a set of features that describe subject matter captured in the content item;
determining user input that corresponds to the partially entered caption; and
generating the set of captions based at least in part on provision of the set of features and the user input to the long-short term memory neural network.

14. The system of claim 13, wherein the system further performs:
filtering the set of captions based at least in part on the language model to restrict the set to captions that include terms or phrases determined to be preferred by the user.

15. The system of claim 11, wherein the system further performs:
determining that the user has selected one of the suggested captions in the set; and
providing the content item for publication with the caption describing the content item, wherein at least a portion of the caption describing the content item includes the selected caption.

16. A non-transitory computer-readable storage medium including instructions that, when executed by at least one processor of a computing system, cause the computing system to perform a method comprising:
determining a content item;
determining a partially entered caption for the content item;
determining a set of captions for the content item based at least in part on a long-short term memory neural network and a language model, wherein the determining further comprises:
generating at least one caption based on the long-short term memory neural network, wherein the long-short term memory neural network is trained based on training data that relates visual features associated with a plurality of content items and captions associated with the plurality of content items, and wherein the long-short term memory neural network generates the at least one caption based on visual features associated with the content item and the partially entered caption for the content item;
evaluating the at least one generated caption based on the language model; and
providing the set of captions in an interface, wherein the set of captions are provided as suggested captions based on the content item and the partially entered caption for the content item.

17. The non-transitory computer-readable storage medium of claim 16, wherein determining the set of captions further causes the computing system to perform:
determining a set of features that describe subject matter captured in the content item; and
generating the set of captions based at least in part on provision of the set of features to the long-short term memory neural network.

18. The non-transitory computer-readable storage medium of claim 16, wherein determining the set of captions further causes the computing system to perform:
- determining a set of features that describe subject matter captured in the content item;
- determining user input that corresponds to the partially entered caption; and
- generating the set of captions based at least in part on provision of the set of features and the user input to the long-short term memory neural network.

19. The non-transitory computer-readable storage medium of claim 18, wherein the computing system further performs:
- filtering the set of captions based at least in part on the language model to restrict the set to captions that include terms or phrases determined to be preferred by the user.

20. The non-transitory computer-readable storage medium of claim 16, wherein the computing system further performs:
- determining that the user has selected one of the suggested captions in the set; and
- providing the content item for publication with the caption describing the content item, wherein at least a portion of the caption describing the content item includes the selected caption.

* * * * *